United States Patent
Tylik et al.

(10) Patent No.: US 11,048,420 B2
(45) Date of Patent: Jun. 29, 2021

(54) LIMITING THE TIME THAT I/O TO A LOGICAL VOLUME IS FROZEN

(71) Applicant: EMC IP Holding Company LLC, Hopkinton, MA (US)

(72) Inventors: Dmitry Tylik, Westborough, MA (US); Matthew H. Long, Uxbridge, MA (US); Jean M. Schiff, Bolton, MA (US); Yuri A. Stotski, Saint Petersburg (RU); Anil K. Koluguri, Raleigh, NC (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 16/398,758

(22) Filed: Apr. 30, 2019

(65) Prior Publication Data
US 2020/0348864 A1 Nov. 5, 2020

(51) Int. Cl.
*G06F 3/06* (2006.01)

(52) U.S. Cl.
CPC .......... *G06F 3/0634* (2013.01); *G06F 3/0611* (2013.01); *G06F 3/0659* (2013.01); *G06F 3/0665* (2013.01); *G06F 3/0673* (2013.01)

(58) Field of Classification Search
CPC .... G06F 3/0634; G06F 3/0611; G06F 3/0659; G06F 3/0665; G06F 3/0673
See application file for complete search history.

(56) References Cited

U.S. PATENT DOCUMENTS

| | | | |
|---|---|---|---|
| 8,255,646 B2 | 8/2012 | Tsuboki et al. | |
| 8,832,334 B2 | 9/2014 | Okita | |
| 8,904,119 B2 | 12/2014 | Yadav et al. | |
| 9,841,930 B2 | 12/2017 | Enohara et al. | |
| 10,255,291 B1* | 4/2019 | Natanzon | G06F 3/0605 |
| 2003/0056058 A1 | 3/2003 | Veitch | |
| 2007/0038656 A1* | 2/2007 | Black | G06F 3/0637 |
| 2008/0250509 A1* | 10/2008 | Ahvenainen | G06F 12/1441 726/34 |
| 2011/0225359 A1* | 9/2011 | Kulkarni | G06F 3/0683 711/114 |
| 2012/0144110 A1 | 6/2012 | Smith | |
| 2014/0059309 A1* | 2/2014 | Brown | G06F 11/1662 711/162 |
| 2014/0122797 A1 | 5/2014 | Yadav et al. | |
| 2014/0359058 A1* | 12/2014 | Karnawat | G06F 3/0611 709/217 |
| 2015/0317219 A1 | 11/2015 | Madhusudana et al. | |
| 2018/0061484 A1* | 3/2018 | Biswas | G11C 11/40615 |
| 2019/0042373 A1 | 2/2019 | Mark | |

* cited by examiner

*Primary Examiner* — Henry Tsai
*Assistant Examiner* — Aurangzeb Hassan
(74) *Attorney, Agent, or Firm* — BainwoodHuang

(57) ABSTRACT

At the start of an I/O cutover process that changes host computer access to a logical volume from a source data storage appliance to a destination data storage appliance, and during which processing of host I/O operations directed to the logical volume is frozen, at least one I/O freeze timer is set. In response to expiration of the I/O freeze timer, and prior to completion of the I/O cutover process, processing of host I/O operations directed to the logical volume is resumed.

16 Claims, 4 Drawing Sheets

LIMITING THE TIME THAT I/O TO A LOGICAL VOLUME IS FROZEN

TECHNICAL FIELD

The present disclosure relates generally to techniques for providing a logical volume of non-volatile data storage from a data storage system to a host computer system, and more specifically to technology for setting at least one timer in order to limit the time period during which host I/O operations directed to the logical volume are not processed while performing I/O cutover from one data storage appliance to another data storage appliance.

BACKGROUND

Data storage systems are arrangements of hardware and software that typically provide non-volatile data storage from non-volatile data storage devices that they contain or are communicably connected to, such as magnetic disk drives, electronic flash drives, and/or optical drives. Data storage systems service host I/O operations (e.g. I/O reads, writes, etc.) that they receive from host computers. The received host I/O operations specify one or more data storage objects (e.g. logical volumes, sometimes also referred to as logical units or "LUNs"), and indicate host I/O data that is to be written to or read from the storage objects. Data storage systems include specialized hardware and execute specialized software that process incoming host I/O operations and perform various data storage tasks to organize and secure the host I/O data that is received from the host computers and store the received host I/O data on the non-volatile data storage devices of the data storage system. A data storage system may sometimes include or consist of a cluster of data storage appliances.

Under various types of circumstances, it may be desirable to migrate a logical volume, e.g. from a first data storage appliance to a second data storage appliance within a cluster of data storage appliances. Examples of such circumstances include without limitation resource imbalances that may arise between different data storage appliances, such as an inadequate amount of resources (e.g. storage, processing, and/or network resources) being available to support the logical volume on a first data storage appliance, and a sufficient or more sufficient amount of resources being available to support the logical volume on a second data storage appliance.

SUMMARY

Previous technologies have exhibited technical shortcomings in providing a process of I/O cutover that is performed during the migration of a logical volume from a source data storage appliance to a destination data storage appliance. Prior to I/O cutover, the host computer accesses the logical volume on the source data storage appliance, e.g. over a data path between an initiator port in the host computer and a target port in the source data storage appliance. During migration of the logical volume from the source data storage appliance to a destination data storage appliance, the data stored in the logical volume is copied from the source data storage appliance to the destination data storage appliance, so that an exact "mirror" copy of the logical volume is contained in the destination data storage appliance. At some point during migration, an I/O cutover process is performed that causes the host computer to stop accessing the copy of the logical volume on the source data storage appliance, and to start accessing the copy of the logical volume on the destination data storage appliance, e.g. over a data path between an initiator port in the host computer and a target port in the destination data storage appliance. During the I/O cutover process, processing of host I/O operations directed to the logical volume is frozen, such that all operations (e.g. all Small Computer System Interface or "SCSI" commands) directed to the logical volume are queued but not processed until after completion of the I/O cutover process. Specifically, processing of all SCSI commands, including host I/O operations transmitted from the host computer and directed to the logical volume, may be frozen during the I/O cutover process on the source data storage appliance, and/or on the destination data storage appliance. Because the I/O cutover process involves multiple steps that are performed by multiple different hardware and software components, there is a significant risk that one or more failures and/or heavy loading of those components may occur during the I/O cutover process, and the occurrence of such failures and/or heavy loading during the I/O cutover process may significantly increase the time required for the I/O cutover process to complete, thus increasing the amount of time during which processing of host I/O operations directed to the logical volume is frozen. Examples of failures that may occur during I/O cutover and significantly increase the total amount of time required to complete the I/O cutover process include, without limitation, loss of connectivity between a control plane component that coordinates the I/O cutover process and the source data storage appliance, loss of connectivity between the control plane component and the destination data storage appliance, failure and restart of the control plane component, network delays experienced within the cluster of data storage appliances, and/or performance degradation within the source and/or destination data storage system.

If failures and/or heavy component loading occur during the I/O cutover process and cause the time required to complete the I/O cutover process to increase beyond the host computer's time limit for completion of host I/O operations, the increased length of time required to complete the I/O cutover process may cause the host computer (e.g. an operating system in the host computer) to fail some number of host I/O operations directed to the logical volume. The specific time period that the host computer's operating system allows for completion of host I/O operations (e.g. a host I/O completion time limit) may differ between operating systems, and/or may be a configurable value. Examples of host I/O operation completion time limits include, without limitation, one minute, ten seconds, and four seconds.

It would be desirable to provide technology that prevents component failures and/or heavy component usage that may occur during the I/O cutover process from causing the I/O cutover process to become so lengthy that host I/O operations directed to the logical volume may be failed by the host computer due to the host I/O completion time limit being exceeded.

To address the above described and/or other shortcomings of previous technologies, the disclosed technology operates by setting at least one I/O freeze timer at the start of an I/O cutover process that changes host computer access to the logical volume from a source data storage appliance to a destination data storage appliance, e.g. at the time processing of host I/O operations directed to a logical volume is frozen at the start of the I/O cutover process. In response to expiration of the I/O freeze timer prior to completion of the I/O cutover process, processing of host I/O operations directed to the logical volume is resumed (or "thawed"). For example, host I/O operations directed to the logical volume may be frozen at the start of the I/O cutover process as part of freezing all SCSI commands directed to the logical volume at the start of the I/O cutover process, and processing of host I/O operations directed to the logical volume may later be resumed as part of resuming processing of all SCSI commands directed to the logical volume.

In some embodiments, processing of host I/O operations directed to the logical volume may be frozen at the start of the I/O cutover process at least in part freezing processing of host I/O operations directed to the logical volume in the destination data storage appliance. The disclosed technology may operate at the time processing of host I/O operations directed to the logical volume is frozen in the destination data storage appliance by setting an I/O freeze timer in the destination data storage appliance. Further in such embodiments, the disclosed technology may resume processing of I/O operations directed to the logical volume in the destination data storage appliance in response to expiration of the I/O freeze timer in the destination data storage appliance.

In some embodiments, processing of host I/O operations directed to the logical volume may be frozen at the start of the I/O cutover process at least in part by freezing processing of host I/O operations directed to the logical volume in the source data storage appliance. The disclosed technology may operate at the time processing of host I/O operations directed to the logical volume is frozen in the source data storage appliance by setting an I/O freeze timer in the source data storage appliance. Further in such embodiments, the disclosed technology may resume processing of I/O operations directed to the logical volume in the source data storage appliance in response to expiration of the I/O freeze counter in the source data storage appliance.

In some embodiments, the disclosed technology may perform the I/O cutover process as part of a process of migrating the logical volume from the source data storage system to the destination data storage system.

In some embodiments, the disclosed technology may perform the I/O cutover process in response to I/O cutover commands issued by I/O cutover logic within a control plane component. The duration of the I/O freeze timer may be indicated by (e.g. included in) a commands issued by the I/O cutover logic.

In some embodiments, the disclosed technology may operate by rejecting a command issued by the I/O cutover logic in response to detecting that the I/O freeze timer has expired when the command is received.

In some embodiments, processing of host I/O operations directed to the logical volume may be frozen in response to a command issued by the I/O cutover logic. Further in such embodiments, a transaction identifier may be generated in response to setting the I/O freeze timer, and the transaction identifier may be passed to the I/O cutover logic. A command issued by the I/O cutover logic subsequent to host I/O operations directed to the logical volume being frozen may include the transaction identifier.

In some embodiments, successful completion of the I/O cutover process may include resuming processing of host I/O operations directed to the logical volume, and the I/O freeze timer may be cancelled in response to successful completion of the I/O cutover process.

Embodiments of the disclosed technology may provide significant advantages over previous technologies. For example, by resuming processing of host I/O operations directed to the logical volume prior to the completion of the I/O cutover process, the disclosed system may prevent component failures and/or heavy component loading during the I/O cutover process from causing host I/O operations directed to the logical volume to be frozen for lengthy time periods. Embodiments of the disclosed technology may prevent component failures and/or heavy component loading during the I/O cutover process from causing the host computer from failing host I/O operations directed to the logical volume due to the completion of those host I/O operations requiring longer than a maximum time period for I/O operation completion defined by the host computer. In some embodiments, the duration of the I/O freeze timer may be equal to or less than the host computer operating system's I/O operation completion time limit, thus preventing host I/O operations directed to the logical volume from being failed due to exceeding the I/O completion time limit while the I/O cutover process is underway. For example, in the case where the host computer's operating system has a host I/O operation completion time limit of four seconds, the duration of the I/O freeze timer may be set to a value of four seconds or less, in order to prevent host I/O operations directed to the logical volume from being timed out by the host computer during the I/O cutover process.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Figure 1:
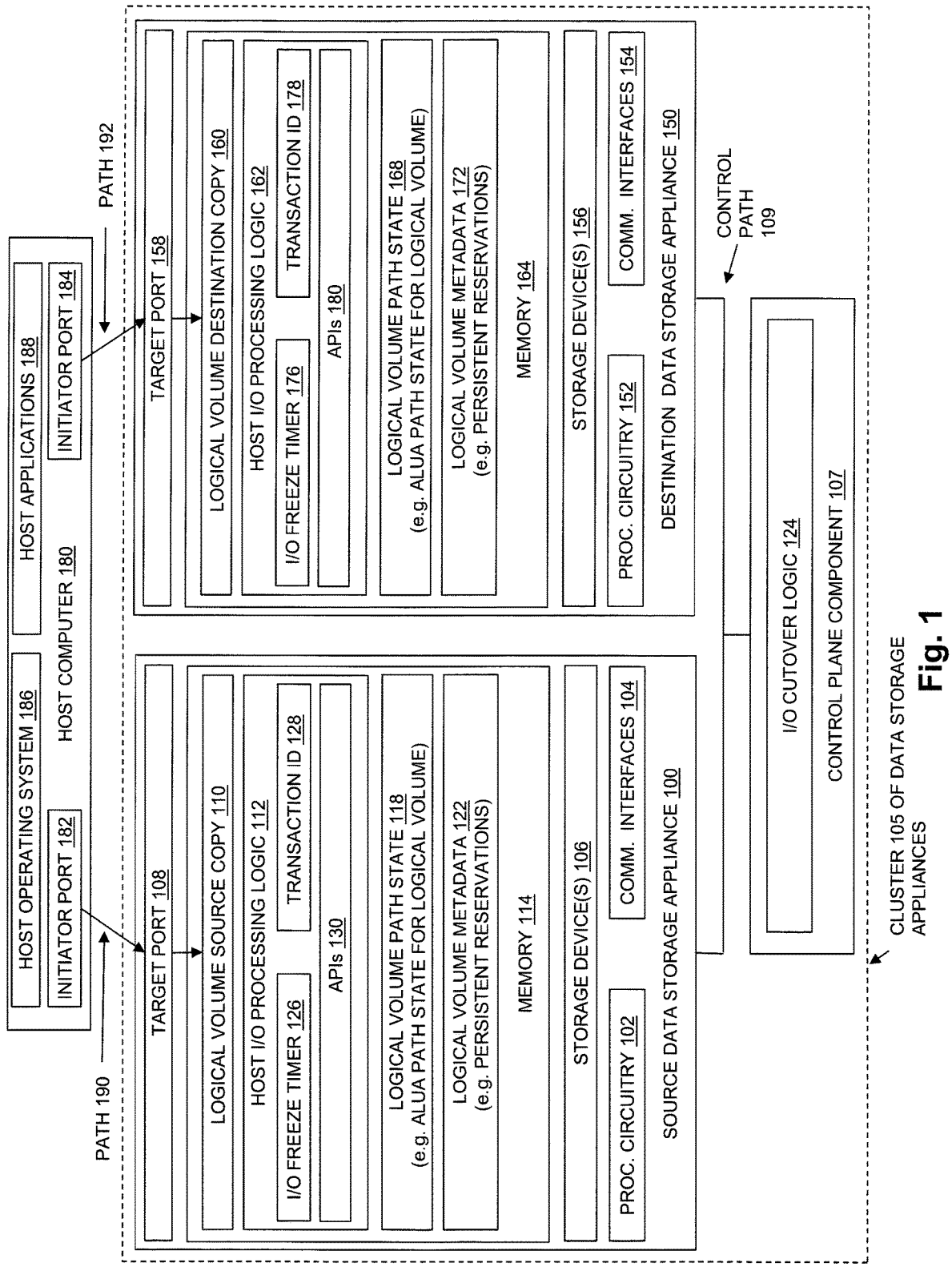
FIG. 1 is a block diagram showing an example of an operational environment and components in some embodiments of the disclosed technology.

Embodiments will now be described with reference to the figures. Such embodiments are provided only by way of example and for purposes of illustration. The scope of the claims is not limited to the examples of specific embodiments shown in the figures and/or otherwise described herein.

The individual features of the particular embodiments, examples, and implementations described herein can be combined in any manner that makes technological sense. Such features are hereby combined to form all possible combinations, permutations and/or variations except to the extent that such combinations, permutations and/or variations have been expressly excluded herein and/or are technically impractical. The description in this document is intended to provide support for all such combinations, permutations and/or variations.

As described herein, an I/O cutover process is performed, e.g. as part of migrating a logical volume from a source data storage appliance to a destination data storage appliance. The I/O cutover process changes host computer access to the logical volume from the source data storage appliance to the destination data storage appliance by changing the states of the paths between the host computer and the source data storage appliance and destination data storage appliance. At the start of the I/O cutover process, e.g. at the time that processing of host I/O operations directed to the logical volume is frozen, at least one I/O freeze timer is set. Processing of host I/O operations directed to the logical volume is resumed (or "thawed") in response to expiration of the I/O freeze timer prior to completion of the I/O cutover process. For example, host I/O operations directed to the logical volume may be frozen at the start of the I/O cutover process as part of freezing all SCSI commands directed to the logical volume at the start of the I/O cutover process, and processing of host I/O operations directed to the logical volume may later be resumed as part of resuming processing of all SCSI commands directed to the logical volume.

In some embodiments, the destination data storage appliance may set an I/O freeze timer in the destination data storage appliance at the start of the I/O cutover process, e.g. at the time processing of host I/O operations directed to the logical volume is frozen in the destination data storage appliance, and processing of host I/O operations directed to the logical volume in the destination data storage appliance may later be resumed in response to expiration of the I/O freeze timer in the destination data storage appliance, e.g. prior to completion of the I/O cutover process.

In addition, or alternatively, the source data storage appliance may set an I/O freeze timer in the source data storage appliance at the start of the I/O cutover process, e.g. at the time processing of host I/O operations directed to the logical volume is frozen in the source data storage appliance, and processing of host I/O operations directed to the logical volume in the source data storage appliance may later be resumed in response to expiration of the I/O freeze timer in the source data storage appliance, e.g. prior to completion of the I/O cutover process.

FIG. 1 is a block diagram showing an example of components in an operational environment including an example of an embodiment of the disclosed technology. As shown in FIG. 1, a Cluster 105 includes multiple data storage appliances, shown for purposes of illustration by Source Data Storage Appliance 100, and Destination Data Storage Appliance 150. While two data storage appliances are shown for purposes of illustration in the example of FIG. 1, Cluster 105 may include additional data storage appliances. Moreover, the technology disclosed herein is not limited to embodiments in which clusters are made up of a specific number of data storage appliances, and may be embodied in clusters having various other specific numbers of data storage appliances.

Each one of the data storage appliances in Cluster 105 contains and/or is communicably coupled to one or more non-volatile data storage devices, such as one or more magnetic disk drives, one or more electronic flash drives, and/or one or more optical drives. In the example of FIG. 1, Source Data Storage Appliance 100 is shown including Storage Devices 106, and Destination Data Storage Appliance 150 is shown including Storage Devices 156.

Each one of the data storage appliances in Cluster 105 also includes communication circuitry that is operable to connect to, and transmit and receive data signals over, one or more communication networks connecting the data storage appliances in Cluster 105 to each other, and also connecting the data storage appliances in Cluster 105 to Host Computer 180. In the example of FIG. 1, Source Data Storage Appliance 100 is shown including Communication Interfaces 104, and Destination Data Storage Appliance 150 is shown including Communication Interfaces 154. Communication Interfaces 104 and Communication Interfaces 154 may each include or consist of SCSI target adapters and/or network interface adapters or the like for converting electronic and/or optical signals received over the network or networks that interconnect the data storage appliances in Cluster 105, and/or a network or networks that further connect the data storage appliances in Cluster 105 to Host Computer 180, into electronic form for use by the respective data storage appliance.

For example, communications between the data storage appliances in Cluster 105 may be performed using the Small Computer System Interface (SCSI) protocol, through paths in a communication network connecting the Host Computer 180 and the data storage appliances. The paths may include or consist of paths between SCSI initiator ports in the Host Computer 180 and SCSI target ports in the communication interfaces of the data storage appliances. For example, Host Computer 180 may include one or more SCSI host adapters, providing some number of initiator ports. In the example of FIG. 1, for purposes of illustration, Host Computer 180 is shown including Initiator Port 182 and Initiator Port 184. The communication interfaces of each data storage appliance may provide SCSI target adapters having some number of target ports. In the example of FIG. 1, for purposes of illustration, Source Data Storage Appliance 100 is shown including Target Port 108, and Destination Data Storage Appliance 150 is shown including Target Port 158.

Each one of the data storage appliances in Cluster 105 includes processing circuitry for executing program code. In the example of FIG. 1, Source Data Storage Appliance 100 is shown including Processing Circuitry 102, and Destination Data Storage Appliance 150 is shown including Processing Circuitry 152. Processing Circuitry 102 and Processing Circuitry 152 may each include or consist of one or more central processing units (CPUs) and associated electronic circuitry.

Each one of the data storage appliances in Cluster 105 also includes a memory operable to store program code and/or associated data structures operable when executed by the processing circuitry to cause the processing circuitry to perform various functions and provide various features of the disclosed technology. In the example of FIG. 1, Source Data Storage Appliance 100 is shown including Memory 114, and Destination Data Storage Appliance 150 is shown including Memory 164. Memory 114 and Memory 164 may each include or consist of volatile memory (e.g., RAM), and/or non-volatile memory, such as one or more ROMs, disk drives, solid state drives, and the like.

The memory in each data storage appliance stores various specific program code that is executable by the processing circuitry of the data storage appliance, and associated data structures used during the execution of the program code. For purposes of illustration, program code that is executable on data storage appliance processing circuitry to cause the processing circuitry to perform the operations and functions described herein with regard to each storage appliance is shown by Host I/O processing logic stored in the memory of each one of the data storage appliances, and I/O cutover logic within a control plane component. For example, Host I/O Processing Logic 112 in Source Data Storage Appliance 100 is operable when executed to cause Processing Circuitry 102 to perform the operations and functions of the disclosed I/O cutover technology in Source Data Storage Appliance 100, and Host I/O Processing Logic 162 is operable when executed to cause Processing Circuitry 152 to perform the operations and functions of the disclosed I/O cutover technology in Destination Data Storage Appliance 150. In some embodiments, Host I/O Processing Logic 112 and/or Host I/O Processing Logic 162 may each include or consist of some number of Application Programming Interfaces (APIs) that are accessible to I/O Cutover Logic 124 in Control Plane Component 107, as shown by APIs 130 and APIs 180.

Control Plane Component 107 may be contained in the memory of and executed on the processing circuitry of another data storage appliance in Cluster 105, and/or may be contained in the memory of and executed on the processing circuitry of Source Data Storage Appliance 100 and/or Destination Data Storage Appliance 150, and includes I/O Cutover Logic 124 that causes such processing circuitry to perform the operations and functions described herein.

Host I/O Processing Logic 112 in Memory 114 is also operable when executed to cause Processing Circuitry 102 to process host I/O operations received from Host Computer 180, e.g. SCSI commands conveyed to Source Data Storage Appliance 100 over the Path 190 from Initiator Port 182 to Target Port 108, and directed to the logical volume of non-volatile storage in Source Data Storage Appliance 100.

Host I/O Processing Logic 162 in Memory 164 is also operable when executed to cause Processing Circuitry 152 to process host I/O operations received from Host Computer 180, e.g. SCSI commands conveyed to Destination Data Storage Appliance 150 over the Path 192 from Initiator Port 184 to Target Port 158, and directed to the logical volume of non-volatile storage in Destination Data Storage Appliance 150.

Although certain program code and data structures are specifically shown in FIG. 1, each data storage appliance may additionally include various other program code and/or other software constructs that are not shown but are additional to those shown, and that are operable in whole or in part to perform specific functions and/or operations described herein. Such additional program logic and other software constructs may include without limitation an operating system, various applications, and/or other processes and/or data structures.

Each data storage appliance in Cluster 105 may also include mappings and allocations that store indications of units of non-volatile data storage that are allocated from the non-volatile data storage devices in that storage appliance to various logical volumes and/or other data storage objects that are provided by that storage appliance. The units of non-volatile data storage allocated to a logical volume may be mapped to respective portions of a logical volume, and may be used to persistently store host data directed to the logical volume in host I/O operations (e.g. write I/O operations) that are received from Host Computer 180. A "slice" is one example of the units of non-volatile data storage (e.g. 256 megabytes or 1 gigabytes in size) that may be allocated from a non-volatile data storage device to a storage object such as a logical volume. Host I/O Processing Logic 112 in Source Data Storage Appliance 100 may store indications of units of non-volatile data storage that are allocated from Storage Device(s) 106 to one or more logical volumes in Source Data Storage Appliance 100, and/or the mappings of such units of non-volatile data storage to respective portions the logical volumes to which they are allocated. Host I/O Processing Logic 162 in Destination Data Storage Appliance 150 may store indications of units of non-volatile data storage that are allocated from Storage Device(s) 156 to one or more logical volumes in Destination Data Storage Appliance 150, and/or the mappings of such units of non-volatile data storage to respective portions the logical volumes to which they are allocated.

The data storage appliances in Cluster 105 provide data storage services that are consumed by Host Computer 180, e.g. by one or more applications executing in Host Computer 180, shown for purposes of illustration by Host Applications 188. Each one of the data storage appliances in Cluster 105 may expose a set of logical volumes (also sometimes referred to as logical units or "LUNS") to the Host Computer 180. In some embodiments, the data storage services provided by the data storage appliances in Cluster 105 include one or more block-based storage services that provide Host Computer 180 with blocks of non-volatile data storage from the logical volumes. Such block-based data storage services may, for example, employ the Small Computer System Interface (SCSI) protocol, the Internet Small Computer System Interface (iSCSI) protocol, and/or Fibre Channel (FC) network technology to communicate between the Host Computer 180 and the data storage appliances in Cluster 105.

While in the example of FIG. 1, Host Computer 180 is shown external to Cluster 105, the techniques described herein are not limited to such embodiments. Alternatively, Host Computer 180 may be located in whole or in part together with the data storage appliances in Cluster 105, as in the case of a hyper-converged storage array that hosts both data storage and compute resources.

During operation of the components shown in FIG. 1, a migration process may be performed to migrate a logical volume from Source Data Storage Appliance 100 to Destination Data Storage Appliance 150, and the disclosed I/O cutover process may be performed during the process of migrating the logical volume from Source Data Storage Appliance 100 to Destination Data Storage Appliance 150. During migration of the logical volume from the Source Data Storage Appliance 100 to Destination Data Storage Appliance 150, host data stored in the logical volume may be copied from Logical Volume Source Copy 110 to Logical Volume Destination Copy 160, so that a complete and exact "mirror" copy of the logical volume is contained in Destination Data Storage Appliance 150. Movement of the host data may be performed in whole or in part by pushing the host data from Source Data Storage Appliance 100 to Destination Data Storage Appliance 150 prior to performing the I/O cutover process to change the host access to the logical volume from Source Data Storage Appliance 100 to Destination Data Storage Appliance 150, and/or by pulling the host data to Destination Data Storage Appliance 150 from Source Data Storage Appliance 100 after performing the I/O cutover process to change the host access to the logical volume from Source Data Storage Appliance 100 to Destination Data Storage Appliance 150. In either case, moving the host data during the migration process may include copying one or more snapshots (point in time copies) of the Logical Volume Source Copy 110 to Destination Data Storage Appliance 150 for storage into units of Storage Device(s) 156 allocated to the Logical Volume Destination Copy 160, and/or synchronously mirroring host I/O operations that are directed to the logical volume to both Source Data Storage Appliance 100 and Destination Data Storage Appliance 150 for some period of time, such that the host I/O operations directed to the logical volume and received over one of Path 190 or Path 192 are synchronously performed on both Source Data Storage Appliance 100 and Destination Data Storage Appliance 150, so that all host data stored in the units of non-volatile data storage allocated from Storage Device(s) 106 to Logical Volume Source Copy 110 may be copied to the units of non-volatile data storage allocated from Storage Device(s) 156 to Logical Volume Destination Copy 160, such that the contents of Logical Volume Destination Copy 160 is the same as the contents of Logical Volume Source Copy 110. Such host data movement between Source Data Storage Appliance 100 and Destination Data Storage Appliance 150 may be performed automatically in the background, e.g. through one or more communication paths external to Path 190 and/or Path 192, so that the data movement is performed transparently with regard to Host Computer 180, and such that there is no interference with or interruption to the data storage services provided from the data storage appliances in Cluster 105 to Host Computer 180.

In some embodiments, an I/O cutover process may change host access to the logical volume from Source Data Storage Appliance 100 to Destination Data Storage Appliance 150 during the migration process without allocating any units of non-volatile storage from Storage Device(s) 156 to store host data written to the logical volume in write I/O operations received by Destination Data Storage Appliance 150 from Host Computer 180 over Path 192. In such embodiments, host I/O operations directed to the logical volume and received by Destination Data Storage Appliance 150 over Path 192 may, for example, be processed using units of non-volatile storage allocated to the Logical Volume Destination Copy 160 from Storage Device(s) 106 in Source Data Storage Device 100, or alternatively using units of non-volatile storage allocated to Logical Volume Source Copy 110.

Prior to the I/O cutover process, Host Computer 180 accesses the logical volume on Source Data Storage Appliance 100, e.g. over Path 190 between Initiator Port 182 in Host Computer 180 and Target Port 108 in the Source Data Storage Appliance 100. For example, prior to the I/O cutover process, Host Computer 180 may access the Logical Volume Source Copy 110 over Path 190 in response to an indication of an "active" path state for Path 190 (e.g. Active-Optimized or Active-Non-Optimized), and an indication of an "unavailable" path state for Path 192 between Initiator Port 184 and Target Port 158. The initial active path state for Path 190 and unavailable path state for Path 192 may be stored in Logical Volume Path State 118 and/or Logical Volume Path State 168. For example, each of Logical Volume Path State 118 and Logical Volume Path State 168 may store a copy of at least a portion of the Asymmetric Logical Unit Access (ALUA) state for the logical volume being migrated, thus making the ALUA state for the logical volume present in and accessible to Host Computer 180 from both Source Data Storage Appliance 100 and Destination Data Storage Appliance 150. As it is generally known, ALUA is an industry standard protocol described in the T10 SCSI-3 specification SPC-3. Logical Volume Path State 118 and Logical Volume Path State 168 may both indicate the current state of Path 190 and Path 192 for accessing the logical volume being migrated, and may be part of the ALUA state that is associated with that logical volume. The ALUA state for the logical volume may be obtained by Host Computer 180 with regard to each target port group that contains a target port through which a copy of the logical volume can be accessed. Accordingly, Logical Volume Path State 118 and Logical Volume Path State 168 may be the same in Source Data Storage Appliance 100 and Destination Data Storage Appliance 150 at any given point in time, and may be obtained by Host Computer 180 by issuing a SCSI Report Target Port Group (RTPG) command to a target port group that contains Target Port 108, and/or by issuing an RTPG command to a target port group that contains Target Port 158. During the I/O cutover process, the path states of Path 190 and Path 192 are swapped, such that after successful completion of the I/O cutover process, Host Computer 180 accesses the logical volume on Destination Data Storage Appliance 150, e.g. over Path 192 between Initiator Port 184 in Host Computer 180 and Target Port 158 in the Source Data Storage Appliance 100, in response to an active state for Path 192. For example, subsequent to successful completion of the I/O cutover process, Host Computer 180 may access the Logical Volume Destination Copy 160 over Path 192 in response to an indication of an active path state (e.g. Active-Optimized or Active-Non-Optimized) for Path 192, as may be stored in Logical Volume Path State 118 and/or Logical Volume Path State 168, and also in response to an indication of an unavailable path state for Path 190 between Initiator Port 184 and Target Port 158, as may also be stored in Logical Volume Path State 118 and/or Logical Volume Path State 168. In some embodiments, the I/O cutover process may be wholly or partly performed under the control of Control Plane Component 107, e.g. at least in part by Source Data Storage Appliance 100 and/or Destination Data Storage Appliance 150 in response to one or more commands issued by I/O Cutover Logic 124 to Source Data Storage Appliance 100 and/or Destination Data Storage Appliance 150 over a logical or physical Control Path 109 within Cluster 105 providing communications between Control Plane Component 107 and Source Data Storage Appliance 100 and/or Destination Data Storage Appliance 150 within Cluster 150.

At the start of the I/O cutover process that changes how Host Computer 180 accesses the logical volume that is being migrated from Source Data Storage Appliance 100 to Destination Data Storage Appliance 150, processing of host I/O operations directed to the logical volume is frozen at Source Data Storage Appliance 100 and/or Destination Data Storage Appliance 150. For example, host I/O operations directed to the logical volume may be frozen at the start of the I/O cutover process as part of freezing all SCSI commands directed to the logical volume at the start of the I/O cutover process in Source Data Storage Appliance 100 and/or Destination Data Storage Appliance 150, and processing of host I/O operations directed to the logical volume may later be resumed as part of resuming processing of all SCSI commands directed to the logical volume in Source Data Storage Appliance 100 and/or Destination Data Storage Appliance 150.

Also at the start of the I/O cutover process, e.g. at the time that processing of host I/O operations directed to the logical volume is frozen, at least one I/O freeze timer is set. In the event that the I/O freeze timer expires prior to completion of the I/O cutover process, processing of host I/O operations directed to the logical volume is resumed.

For example, in some embodiments, at the start of the I/O cutover process, I/O Cutover Logic 124 may issue one or more commands to Destination Data Storage Appliance 150 (e.g. to APIs 180) to cause Destination Data Storage Appliance 150 to freeze processing of host I/O operations directed to the logical volume. In response to such commands, Host I/O Processing Logic 162 freezes processing of host I/O operations directed to the logical volume. For example, Host I/O Processing Logic 162 may freeze processing of host I/O operations directed to the logical volume as part of freezing processing of all SCSI commands directed to the logical volume on Destination Data Storage Appliance 150, such that all SCSI commands directed to the logical volume on the Destination Data Storage Appliance 150 may be queued in Host I/O Processing Logic 162 but not processed by Host I/O Processing Logic 162 until processing of SCSI commands is later thawed on Destination Data Storage Appliance 150 (e.g. in response to expiration of I/O Freeze Timer 176 or completion of the I/O cutover process). At the time Host I/O Processing Logic 162 freezes processing of host I/O operations directed to the logical volume, Host I/O Processing Logic 162 also sets I/O Freeze Timer 176 in Destination Data Storage Appliance 150, causing I/O Freeze Timer 176 to begin to run. In the case where I/O Freeze Timer 176 expires before completion of the I/O cutover process, Host I/O Processing Logic 162 detects and responds to expiration of I/O Freeze Timer 176 by resuming (or "thawing") processing of host I/O operations directed to the logical volume in Destination Data Storage Appliance 150, e.g. by resuming processing by Host I/O Processing Logic 162 of all SCSI commands directed to the logical volume.

In some embodiments, also at the start of the I/O cutover process, but after I/O Cutover Logic 124 has issued one or more commands to Destination Data Storage Appliance 150 that caused Destination Data Storage Appliance 150 to freeze processing of host I/O operations directed to the logical volume in Destination Data Storage Appliance 150 (e.g. by causing Host I/O Processing Logic 162 to freeze processing of all SCSI commands directed to the logical volume in Destination Data Storage Appliance 150), and that further resulted in Host I/O Processing Logic 162 setting I/O Freeze Timer 176, I/O Cutover Logic 124 may issue one or more commands to Source Data Storage Appliance 100 (e.g. to APIs 130) that cause Source Data Storage Appliance 100 to freeze processing of host I/O operations directed to the logical volume in Source Data Storage Appliance 100. In response to receipt of such commands, Host I/O Processing Logic 112 may freeze processing of host I/O operations directed to the logical volume. For example, Host I/O Processing Logic 112 may freeze processing of host I/O operations directed to the logical volume as part of freezing processing of all SCSI commands directed to the logical volume on Source Data Storage Appliance 100, such that all SCSI commands directed to the logical volume on the Source Data Storage Appliance 100 may be queued in Host I/O Processing Logic 112 but not processed by Host I/O Processing Logic 112 until processing of SCSI commands is later thawed on Source Data Storage Appliance 100 (e.g. in response to expiration of I/O Freeze Timer 126 or completion of the I/O cutover process). At the time Host I/O Processing Logic 112 freezes processing of host I/O operations directed to the logical volume, Host I/O Processing Logic 112 may also set I/O Freeze Timer 126 in Source Data Storage Appliance 100, causing I/O Freeze Timer 126 to begin to run. In the case where I/O Freeze Timer 126 expires before completion of the I/O cutover process, Host I/O Processing Logic 112 detects and responds to expiration of I/O Freeze Timer 126 by resuming (or "thawing") processing of host I/O operations directed to the logical volume in Source Data Storage Appliance 100, e.g. by resuming processing by Host I/O Processing Logic 112 of all SCSI commands directed to the logical volume.

In some embodiments, the duration of I/O Freeze Timer 126 and/or of I/O Freeze Timer 176 may be indicated by (e.g. included in) one or more of the commands issued by I/O Cutover Logic 124. For example, the duration of I/O Freeze Timer 176 may be passed to Destination Data Storage Appliance 150 from I/O Cutover Logic 124 in a command passed from I/O Cutover Logic 124 to Destination Data Storage Appliance 150 that causes Destination Data Storage Appliance 150 to freeze processing of all SCSI commands directed to the logical volume. Similarly, the duration of I/O Freeze Timer 126 may be passed to Source Data Storage Appliance 100 from I/O Cutover Logic 124 in a command passed from I/O Cutover Logic 124 to Source Data Storage Appliance 100 that causes Source Data Storage Appliance 100 to freeze processing of all SCSI commands directed to the logical volume. The duration of I/O Freeze Timer 126 and/or I/O Freeze Timer 176 may be set to a time period that is equal to or less than an I/O completion time limit of Host Operating System 186, in order to prevent host I/O operations directed to the logical volume from being failed by Host Computer 180 due to the time needed for their completion exceeding the I/O completion time limit while the I/O cutover process is underway. For example, in a case where Host Operating System 186 includes a host I/O operation completion time limit of four seconds, the duration of I/O Freeze Timer 176 and/or I/O Freeze Timer 126 may be set to a value equal to or less than four seconds. Those skilled in the art will recognize that the disclosed technology is not limited to using a specific I/O freeze timer duration, and that other specific I/O freeze timer durations may be used as may be appropriate in various embodiments, operating environments, and/or configurations.

In some embodiments, Source Data Storage Appliance 100 and/or Destination Data Storage Appliance 200 may reject one or more commands issued by I/O Cutover Logic 124 that are received after the respective I/O freeze timer has expired. For example, when Source Data Storage Appliance 100 receives a command from I/O Cutover Logic 124, Host I/O Processing Logic 112 may check to see whether I/O Freeze Timer 126 has expired. In response to detecting that I/O Freeze Timer 126 has already expired when the command is received, Host I/O Processing Logic 112 may reject the command, and return a unique error code that indicates to Host I/O Processing Logic 124 that the command was not performed because I/O Freeze Timer 126 had previously expired when the command was received. Similarly, when Destination Data Storage Appliance 150 receives a command from I/O Cutover Logic 124, Host I/O Processing Logic 162 may check to see whether I/O Freeze Timer 176 has expired. In response to detecting that I/O Freeze Timer 176 has already expired when the command is received, Host I/O Processing Logic 162 may reject the command, and return a unique error code that indicates to I/O Cutover Logic 124 that the command was not performed because I/O Freeze Timer 176 had previously expired when the command was received.

As described above, in some embodiments, processing of host I/O operations directed to the logical volume may be frozen in Source Data Storage Appliance 100 and/or Destination Data Storage Appliance 150 in response to one or more commands issued by I/O Cutover Logic 124. Further in such embodiments, a transaction identifier for the I/O cutover process may be generated by Source Data Storage Appliance 100 and/or Destination Data Storage Appliance 150 at the time that the respective I/O freeze timer is set, and that transaction identifier may be passed to I/O Cutover Logic 124 for inclusion in commands issued during the remainder of the I/O cutover process. For example, at the time that I/O Freeze Timer 126 is set when processing of host I/O operations directed to the logical volume in Source Data Storage Appliance 100 frozen, Host I/O Processing Logic 112 may also generate a Transaction Identifier 128 that is valid for the remainder of the I/O cutover process, and pass Transaction Identifier 128 to I/O Cutover Logic 124.

Similarly, at the time I/O Freeze Timer 176 is set and/or the time that processing of host I/O operations directed to the logical volume is frozen in Destination Data Storage Appliance 150, Host I/O Processing Logic 162 may generate a Transaction Identifier 178 that is valid for the remainder of the I/O cutover process, and pass Transaction Identifier 178 to I/O Cutover Logic 124.

I/O Cutover Logic 124 may store a copy of Transaction Identifier 128, and include Transaction Identifier 128 in any commands issued by I/O Cutover Logic 124 to Source Data Storage Appliance 100 subsequent to host I/O operations directed to the logical volume being frozen on Source Data Storage Appliance 100 and/or I/O Freeze Timer 126 being started, for the remainder of the I/O cutover process. Host I/O Processing Logic 112 may check the value of transaction identifiers included in commands received from I/O Cutover Logic 124 for the remainder of the I/O cutover process, e.g. after host I/O operations directed to the logical volume are frozen on Source Data Storage Appliance 100 and/or I/O Freeze Timer 126 is started. Host I/O Processing Logic 112 may reject a command subsequently received by Source Data Storage Appliance 100 from I/O Cutover Logic 124 during the remainder of the I/O cutover process that includes an invalid transaction ID, i.e. that includes a transaction identifier that does not match Transaction Identifier 128. Host I/O Processing Logic 112 may then return a unique error code that indicates to I/O Cutover Logic 124 that the command was not performed because the transaction identifier in the command did not match Transaction Identifier 128.

I/O Cutover Logic 124 may also store a copy of Transaction Identifier 178, and include Transaction Identifier 178 in commands issued by I/O Cutover Logic 124 to Destination Data Storage Appliance 150 after host I/O operations directed to the logical volume are frozen on Destination Data Storage Appliance 150 and/or I/O Freeze Timer 176 is started, and for the remainder of the I/O cutover process. Host I/O Processing Logic 162 may check the value of transaction identifiers included in commands received from I/O Cutover Logic 124 for the remainder of the I/O cutover process, e.g. after host I/O operations directed to the logical volume are frozen on Destination Data Storage Appliance 150 and/or I/O Freeze Timer 176 is started. Host I/O Processing Logic 162 may reject a command subsequently received by Destination Data Storage Appliance 150 from I/O Cutover Logic 124 during the I/O cutover process that includes an invalid transaction ID, i.e. that includes a transaction identifier that does not match Transaction Identifier 178. Host I/O Processing Logic 162 may then return a unique error code that indicates to I/O Cutover Logic 124 that the command was not performed because the transaction identifier in the command did not match Transaction Identifier 178.

In some embodiments, successful completion of the I/O cutover process may be considered to have occurred when both i) the state of Path 190 has been successfully changed to unavailable, and ii) the state of Path 192 has been changed to active. Successful completion of the I/O cutover process may further include resuming processing of host I/O operations directed to the logical volume. The I/O freeze timer or timers may also be cancelled in response to successful completion of the I/O cutover process. For example, successful completion of the I/O cutover process may include I/O Cutover Logic 124 issuing one or more commands to Destination Data Storage Appliance 150 that cause Host I/O Processing Logic 162 to resume processing of host I/O operations directed to the logical volume by in Destination Data Storage Appliance 150 (e.g. by causing Host I/O Processing Logic 162 to resume processing of all SCSI commands directed to the logical volume). I/O Freeze Timer 176 may also be cancelled in response to successful completion of the I/O cutover process, e.g. at the time processing of host I/O operations directed to the logical volume is resumed by Host I/O Processing Logic 162.

In some embodiments, after I/O Cutover Logic 124 issued one or more commands to Destination Data Storage Appliance 150 that caused Host I/O Processing Logic 162 to resume processing of host I/O operations directed to the logical volume, and that also caused I/O Freeze Timer 176 to be cancelled, successful completion of the I/O cutover process may further include I/O Cutover Logic 124 issuing one or more commands to Source Data Storage Appliance 100 that cause Host I/O Processing Logic 112 to resume processing of host I/O operations directed to the logical volume in Source Data Storage Appliance 150 (e.g. by causing Host I/O Processing Logic 112 to resume processing of all SCSI commands directed to the logical volume). I/O Freeze Timer 126 may also be cancelled in response to successful completion of the I/O cutover process, e.g. at the same time that processing of host I/O operations directed to the logical volume is resumed by Host I/O Processing Logic 112.

Figure 2:
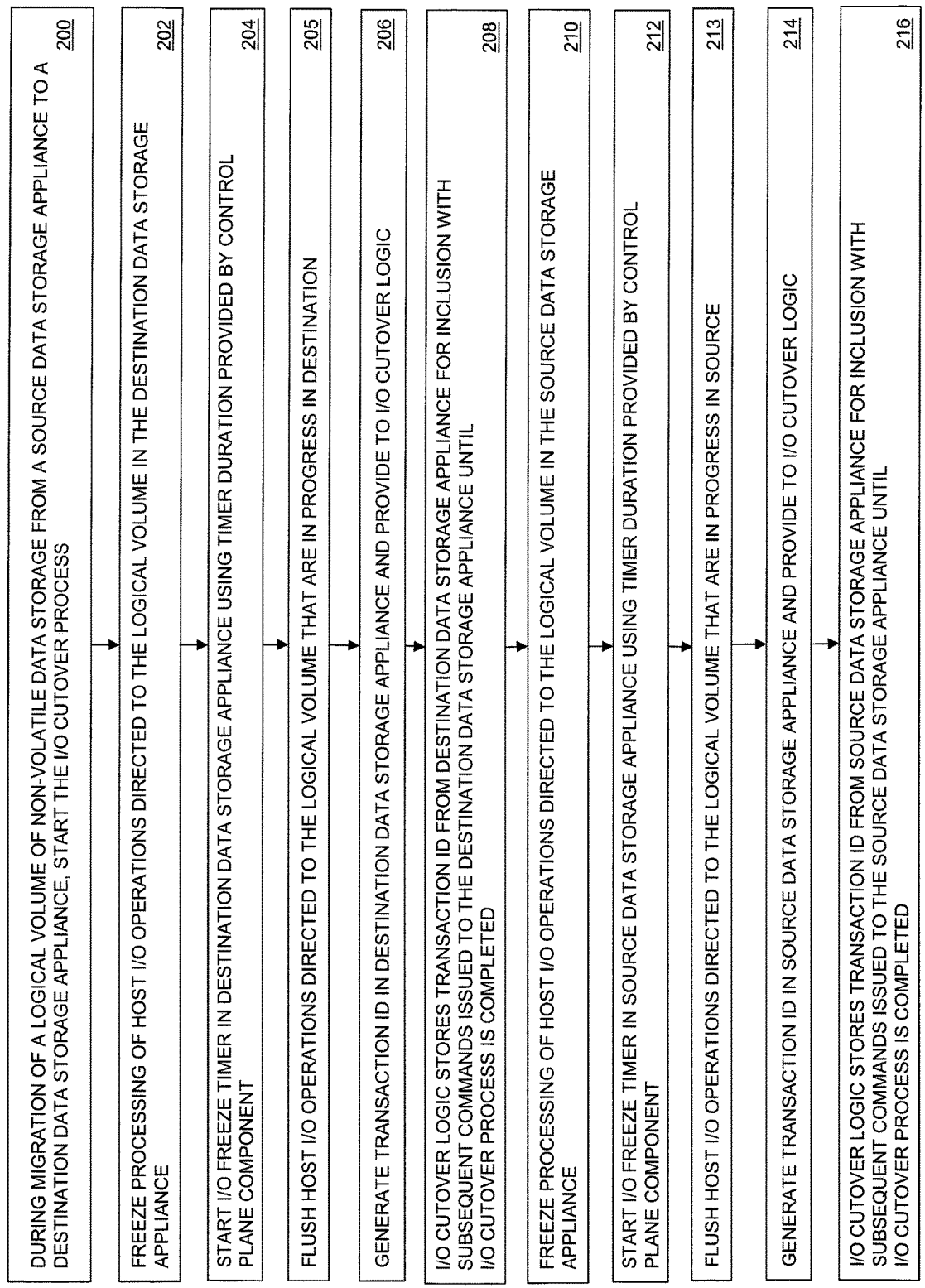
FIG. 2 is a flow chart showing steps performed in some embodiments during initial stages of an I/O cutover process.

FIG. 2 is a flow chart showing steps performed in some embodiments during initial stages of the I/O cutover process. At step 200 the I/O cutover process is started, e.g. at some point during the migration of a logical volume from a source data storage appliance to a destination data storage appliance, e.g. during a migration of a logical volume from Source Data Storage Appliance 100 to Destination Data Storage Appliance 150.

At step 202, processing of host I/O operations directed to the logical volume is frozen at the destination data storage appliance. For example, I/O Cutover Logic 124 may issue a command to Destination Data Storage Appliance 150 that causes Host I/O Processing Logic 162 to freeze processing of host I/O operations directed to the logical volume in Destination Data Storage Appliance 150, e.g. by freezing the processing of all SCSI commands directed to the logical volume.

At step 204, an I/O freeze timer is set and begins running in Destination Data Storage Appliance 150. For example, in response to the same I/O cutover command issued by I/O Cutover Logic 124 that caused processing of host I/O operations directed to the logical volume to be frozen in Destination Data Storage Appliance 150, Host I/O Processing Logic 162 sets I/O Freeze Timer 176 such that I/O Freeze Timer 176 is started and begins running, and such that I/O Freeze Timer 176 will expire after an I/O freeze timer duration indicated by the command issued by I/O Cutover Logic 124 to Destination Data Storage Appliance 150 that caused host I/O operations directed to the logical volume to be frozen on the Destination Data Storage Appliance 150.

At step 205, some number of host I/O operations directed to the logical volume that are in progress on the Destination Data Storage Appliance 150 at the time processing of host I/O operations directed to the logical volume is frozen on the Destination Data Storage Appliance 150 may be flushed, e.g. allowed to complete. For example, at the time when processing of host I/O operations directed to the logical volume is frozen, Host I/O Processing Logic 162 may complete the processing of one or more host I/O operations directed to the logical volume that were already in progress in Destination Data Storage Appliance 150 at that time, e.g. that were previously received from Host Computer 180 and started on Destination Data Storage Appliance 150.

At step 206, in response to the same command that caused I/O operations directed to the logical volume to be frozen on the Destination Data Storage Appliance 150, and that also caused I/O Freeze Timer 176 to be set and in-progress host I/O operations directed to the logical volume to be flushed on Destination Data Storage Appliance 150, Host I/O Processing Logic 162 may generate a transaction identifier for the I/O cutover process that is valid for the remainder of the I/O cutover process. For example, at step 206, Host I/O Processing Logic 162 may generate Transaction Identifier 178, and provide a copy of Transaction Identifier 178 to the I/O Cutover Logic 124.

In some embodiments, the Transaction Identifier 178 may only be generated and provided to I/O Cutover Logic 124 as part of an indication of success with regard to i) successful freezing of all SCSI commands directed to the logical volume on the Destination Data Storage Appliance 150, ii) successful setting of I/O Freeze Timer 176, and iii) successful flushing of all SCSI commands that were in progress at the time that processing of all SCSI commands directed to the logical volume was frozen on Destination Data Storage Appliance 150. In this way, Host I/O Processing Logic 162 may process a single command received from I/O Cutover Logic 124 as an atomic operation that either succeeds in performing all of steps 202, 204, 205, and 206, or generates a failure indication to I/O Cutover Logic 124. When the command issued by I/O Cutover Logic 124 that causes steps 202, 204, 205, and 206 to be performed successfully completes, and I/O Cutover Logic 124 receives the Transaction Identifier 178, I/O Cutover Logic 124 knows that all in-progress SCSI commands have been flushed from Destination Data Storage Appliance 150, and that SCSI command processing has been frozen in Destination Data Storage Appliance 150.

At step 208, I/O Cutover Logic 124 stores the copy of Transaction Identifier 178 it receives from Destination Data Storage Appliance 150, and includes a copy of Transaction Identifier 178 in subsequent I/O cutover commands issued to Destination Data Storage Appliance 150 until the I/O cutover process is completed.

At step 210, processing of host I/O operations directed to the logical volume is frozen at the source data storage appliance. For example, I/O Cutover Logic 124 may issue one or more commands to Source Data Storage Appliance 100 that cause Host I/O Processing Logic 112 to freeze processing of host I/O operations directed to the logical volume in Source Data Storage Appliance 100, e.g. by freezing the processing of all SCSI commands directed to the logical volume.

At step 212, an I/O freeze timer is set and begins running in Source Data Storage Appliance 100. For example, in response to the same command issued by I/O Cutover Logic 124 that caused processing of host I/O operations directed to the logical volume to be frozen in Source Data Storage Appliance 100, Host I/O Processing Logic 112 sets I/O Freeze Timer 126 such that I/O Freeze Timer 126 is started and begins running, and such that I/O Freeze Timer 126 will expire after an I/O freeze timer duration indicated by the command issued by I/O Cutover Logic 124 to Source Data Storage Appliance 100 that caused host I/O operations directed to the logical volume to be frozen on the Source Data Storage Appliance 150.

At step 213, some number of host I/O operations directed to the logical volume that are in progress on the Source Data Storage Appliance 100 at the time processing of host I/O operations directed to the logical volume is frozen on the Source Data Storage Appliance 100 may be flushed, e.g. allowed to complete. For example, at the time when processing of host I/O operations directed to the logical volume is frozen, Host I/O Processing Logic 112 may complete the processing of one or more host I/O operations directed to the logical volume that were already in progress in Source Data Storage Appliance 100 at that time, e.g. that were previously received from Host Computer 180 and started on Source Data Storage Appliance 100.

At step 214, in response to the same command that caused I/O operations directed to the logical volume to be frozen on the Source Data Storage Appliance 100, and that also caused I/O Freeze Timer 126 to be set and in-progress host I/O operations directed to the logical volume to be flushed on Source Data Storage Appliance 100, Host I/O Processing Logic 112 may generate a transaction identifier that is valid for the remainder of the I/O cutover process. For example, at step 214, Host I/O Processing Logic 112 may generate Transaction Identifier 128, and provide a copy of Transaction Identifier 128 to the I/O Cutover Logic 124.

In some embodiments, the Transaction Identifier 128 may only be generated and provided to I/O Cutover Logic 124 as part of an indication of success with regard to i) successful freezing of all SCSI commands directed to the logical volume on the Source Data Storage Appliance 100, ii) successful setting of I/O Freeze Timer 126, and iii) successful flushing of all SCSI commands that were in progress at the time that processing of all SCSI commands directed to the logical volume was frozen on Source Data Storage Appliance 100. In this way, Host I/O Processing Logic 112 may process a single command received from I/O Cutover Logic 124 as an atomic operation that either succeeds in performing all of steps 210, 212, 213, and 214, or generates a failure indication to I/O Cutover Logic 124. When the command issued by I/O Cutover Logic 124 that causes steps 210, 212, 213, and 214 to be performed successfully completes, and I/O Cutover Logic 124 receives the Transaction Identifier 128, I/O Cutover Logic 124 knows that all in-progress SCSI commands have been flushed from Source Data Storage Appliance 100, and that SCSI command processing has been frozen in Source Data Storage Appliance 100.

At step 216, I/O Cutover Logic 124 stores the copy of Transaction Identifier 128 it receives from Source Data Storage Appliance 100, and includes a copy of Transaction Identifier 128 in subsequent I/O cutover commands issued to Source Data Storage Appliance 100 until the I/O cutover process is completed.

Figure 3:
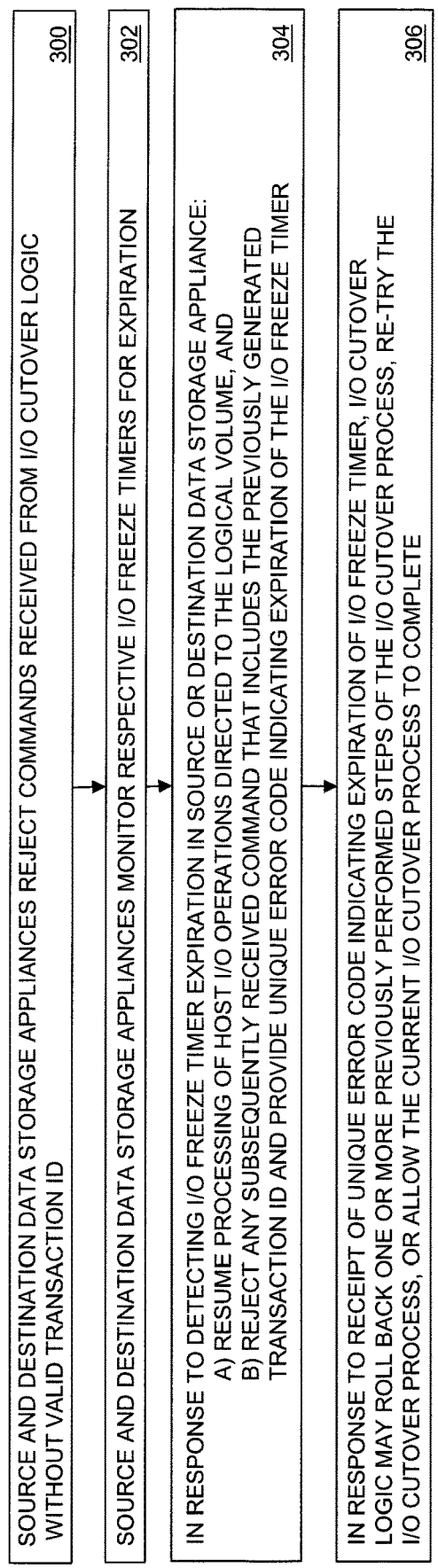
FIG. 3 is a flow chart showing steps performed in some embodiments based on the disclosed I/O freeze timers and transaction identifiers.

FIG. 3 is a flow chart showing steps performed in some embodiments during the I/O cutover process, based on the disclosed I/O freeze timers and transaction identifiers. At step 300, throughout the remainder of the I/O cutover process that is subsequent to generation of one or more transaction identifiers for the I/O cutover process, and up until successful completion of the I/O cutover process, Source Data Storage Appliance 100 and Destination Data Storage Appliance 150 may reject commands received from I/O Cutover Logic 124 that do not include a valid transaction identifier for the I/O cutover process. For example, after it generates Transaction Identifier 128 and provides a copy of Transaction Identifier 128 to I/O Cutover Logic 124, Host I/O Processing Logic 112 may reject commands received by Source Data Storage Appliance 100 from I/O Cutover Logic 124 that do not include a copy of Transaction Identifier 128, up until successful completion of the I/O cutover process. Similarly, after it generates Transaction Identifier 178 and provides a copy of Transaction Identifier 178 to I/O Cutover Logic 124, Host I/O Processing Logic 162 may reject commands received by Destination Data Storage Appliance 150 from I/O Cutover Logic 124 that do not include a copy of Transaction Identifier 178, up until successful completion of the I/O cutover process.

At step 302, throughout the remainder of the I/O cutover process subsequent to setting of one or more I/O freeze timers for the I/O cutover process, and up until successful completion of the I/O cutover process, Source Data Storage Appliance 100 and/or Destination Data Storage Appliance 150 monitor one or more I/O freeze timers for expiration. For example, after it sets and starts I/O Freeze Timer 126, Host I/O Processing Logic 112 may monitor I/O Freeze Timer 126 for expiration, up until successful completion of the I/O cutover process, at which time I/O Freeze Timer 126 is cleared. Similarly, after it sets and starts I/O Freeze Timer 176, Host I/O Processing Logic 162 may monitor I/O Freeze Timer 176 for expiration, up until successful completion of the I/O cutover process, at which time I/O Freeze Timer 176 is cleared.

At step 304, in response to detecting I/O freeze timer expiration in Source Data Storage Appliance 100 and/or Destination Data Storage Appliance 150, a) processing of host I/O operations directed to the logical volume is resumed, and b) subsequently received commands that include the previously generated transaction identifier are rejected. In the case where a command is received and rejected after expiration of an I/O freeze timer, a unique error code is provided to the I/O Cutover Logic 124 indicating that the command failed due to expiration of the I/O freeze timer. For example, in response to detecting expiration of I/O Freeze Timer 126, Host I/O Processing Logic 112 may a) automatically resume processing of host I/O operations directed to the logical volume (e.g. by resuming processing of all SCSI command directed to the logical volume), and b) reject subsequently received commands that include Transaction Identifier 128, and provide I/O Cutover Logic 124 with a unique error code indicating that command failure was due to expiration of the I/O Freeze Timer 126. Similarly, in response to detecting expiration of I/O Freeze Timer 176, Host I/O Processing Logic 162 may a) automatically resume processing of host I/O operations directed to the logical volume (e.g. by resuming processing of all SCSI command directed to the logical volume), and b) reject subsequently received commands that include Transaction Identifier 178, and provide I/O Cutover Logic 124 with a unique error code indicating that command failure was due to expiration of the I/O Freeze Timer 176.

At step 306, in response to receiving a unique error code indicating the expiration of an I/O freeze timer (e.g. a unique error code indicating expiration of I/O Freeze Timer 126 and/or expiration of I/O Freeze Timer 176), I/O Cutover Logic 124 may roll back (i.e. undo) one or more previously performed steps of the I/O cutover process, re-try the entire I/O cutover process from the beginning, or allow the I/O cutover process to complete in situations where the current I/O cutover process can be safely completed (i.e. without introducing a risk of data corruption). Some specific examples of possible actions that may be performed by I/O Cutover Logic 124 in response to expiration of an I/O freeze timer are further described below.

Figure 4:
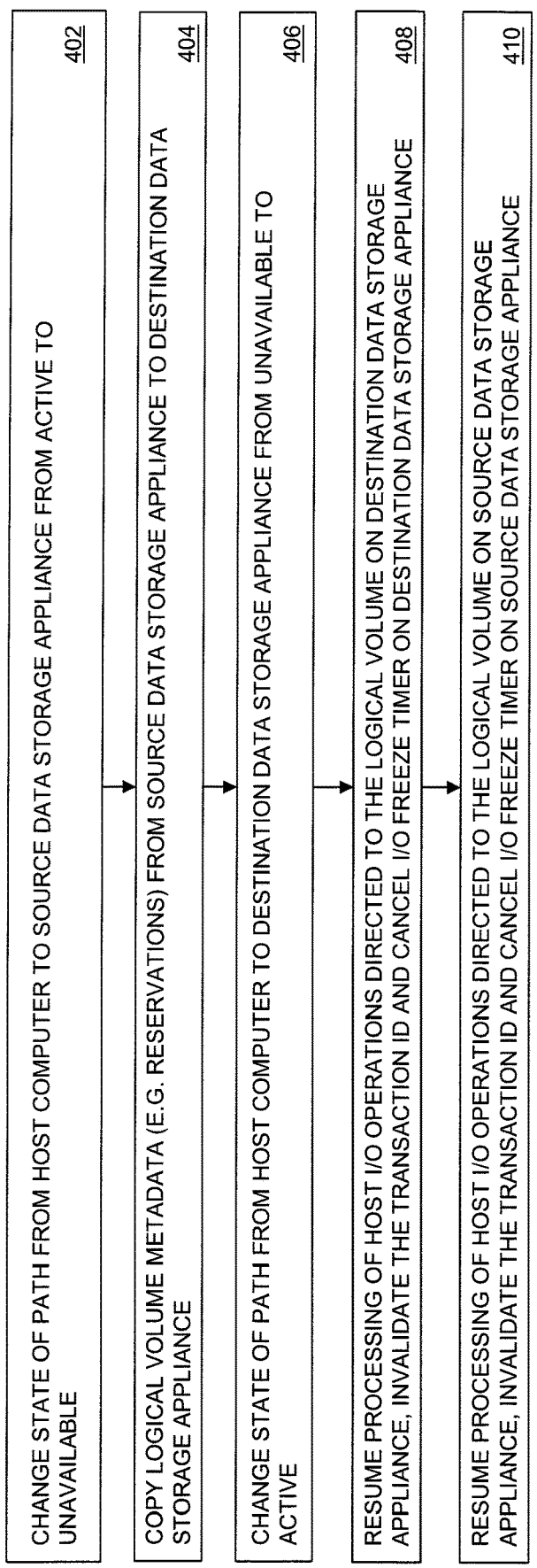
FIG. 4 is a flow chart showing steps performed in some embodiments through completion of the I/O cutover process.

FIG. 4 is a flow chart showing steps performed in some embodiments following the steps of FIG. 2, in combination with the steps of FIG. 3, and through completion of the I/O cutover process. At step 402, the state of Path 190 from Host Computer 180 to Source Data Storage Appliance 100 is changed from active to unavailable. For example, I/O Cutover Logic 124 may issue one or more commands to Source Data Storage Appliance 100 that change the state of Path 190 stored in Logical Volume Path State 118 from active to unavailable, and may also issue one or more commands to Destination Data Storage Appliance 150 that change the state of Path 190 stored in Logical Volume Path State 168 from active to unavailable.

At step 404, metadata for the logical volume is copied from Source Data Storage Appliance 100 to Destination Data Storage Appliance 150. For example, I/O Cutover Logic 124 may issue one or more commands to Source Data Storage Appliance 100 and/or Destination Data Storage Appliance 150 that cause Logical Volume Metadata 122 in Source Data Storage Appliance 100 to be copied to Logical Volume Metadata 172 in Destination Data Storage Appliance 150. The logical volume metadata copied in step 404 may, for example, include one or more SCSI persistent reservations made by a host computer, e.g. by Host Operating System 186 in Host Computer 180, with regard to the logical volume. Such persistent reservations may, for example, control access to the logical volume, e.g. by preventing a host computer other than Host Computer 180 from making changes to the logical volume.

At step 406, the state of Path 192 from Host Computer 180 to Destination Data Storage Appliance 100 is changed from unavailable to active. For example, I/O Cutover Logic 124 may issue one or more commands to Destination Data Storage Appliance 150 that change the state of Path 192 stored in Logical Volume Path State 168 from unavailable to active, and may also issue one or more commands to Source Data Storage Appliance 100 that change the state of Path 192 stored in Logical Volume Path State 118 from unavailable to active.

At step 408, processing of host I/O operations directed to the logical volume is resumed at the destination data storage appliance. For example, I/O Cutover Logic 124 may issue one or more commands to Destination Data Storage Appliance 150 that cause Host I/O Processing Logic 162 to resume processing of host I/O operations directed to the logical volume in Destination Data Storage Appliance 150, (e.g. by resuming processing of all SCSI command directed to the logical volume in Destination Data Storage Appliance 150). Further in step 408, also in response to the command(s) that caused Host I/O Processing Logic 162 to resume processing of host I/O operations directed to the logical volume, Host I/O Processing Logic 162 may invalidate the transaction ID for Destination Data Storage Appliance 150, e.g. Transaction ID 178. In addition, step 408 may further include, also in response to the command(s) that caused Host I/O Processing Logic 162 to resume processing of host I/O operations directed to the logical volume, cancellation of I/O Freeze Timer 176 by Host I/O Process Logic 162.

At step 410, processing of host I/O operations directed to the logical volume is resumed at the source data storage appliance. For example, I/O Cutover Logic 124 may issue one or more commands to Source Data Storage Appliance 100 that cause Host I/O Processing Logic 112 to resume processing of host I/O operations directed to the logical volume in Source Data Storage Appliance 100 (e.g. by resuming processing of all SCSI command directed to the logical volume in Source Data Storage Appliance 100). Further in step 410, also in response to the command(s) that caused Host I/O Processing Logic 112 to resume processing of host I/O operations directed to the logical volume, Host I/O Processing Logic 112 may invalidate the transaction ID for Source Data Storage Appliance 100, e.g. Transaction ID 128. In addition, step 410 may further include, also in response to the command(s) that caused Host I/O Processing Logic 112 to resume processing of host I/O operations directed to the logical volume, cancellation of I/O Freeze Timer 126 by Host I/O Process Logic 162.

I/O Cutover Logic 124 may operate in various different ways to handle specific failure modes at different points during the I/O cutover process. For example, depending on the specific failure and state of the I/O cutover process, I/O Cutover Logic 124 may roll back (i.e. undo) one or more previously performed steps of the I/O cutover process, re-try the entire I/O cutover process from the beginning, or allow the I/O cutover process to complete. Examples of failure modes that may occur during the I/O cutover process include the following:

- Failure Mode 1: I/O Cutover Logic 124 fails, e.g. the Control Plane Component 107 fails on one data storage appliance and is restarted on another data storage appliance.
- Failure Mode 2: Connectivity between I/O Cutover Logic 124 and Source Data Storage Appliance 100 is broken, e.g. Source Data Storage Appliance 100 becomes temporarily unreachable, or Source Data Storage Appliance 100 becomes permanently lost.
- Failure Mode 3: Connectivity between I/O Cutover Logic 124 and Destination Data Storage Appliance 150 is broken, e.g. Destination Data Storage Appliance 150 becomes temporarily unreachable, or Destination Data Storage Appliance 150 becomes permanently lost.
- Failure Mode 4: Lengthy network delays result in significant delays in communication between I/O Cutover Logic 124 and Source Data Storage Appliance 100, and/or between I/O Cutover Logic 124 and Destination Data Storage Appliance 150.
- Failure Mode 5: Performance degradation in Source Data Storage Appliance 100 and/or Destination Data Storage Appliance 150 results in completion of specific individual steps in the I/O cutover process being significantly delayed.

The disclosed technology may be embodied to handle the above failure modes during the I/O cutover process while also avoiding introducing a he risk of data corruption that may arise when the states of Path 190 and Path 192 are both active at the same time.

For example, at the point in the I/O cutover process at which processing of host I/O operations directed to the logical volume is being frozen on Destination Data Storage Appliance 150, in the case of Failure Mode 2, the state of Path 190 may be active and the state of Path 192 may be unavailable, and Control Plane Component 107 may retry the I/O cutover process. In the cases of Failure Modes 3, 4, and 5, the state of Path 190 may be unavailable and the state of Path 192 may be active, and the I/O cutover process may be allowed to complete prior to expiration of an I/O freeze timer.

In another example, at the point in the I/O cutover process at which processing of host I/O operations directed to the logical volume is being frozen on the Source Data Storage Appliance 100, and/or at which in-progress host I/O operations directed to the logical volume are being flushed, in the case of Failure Mode 1, the state of Path 190 may be active and the state of Path 192 may be unavailable, and I/O Cutover Logic 124 may roll back the I/O cutover process by un-doing previously performed operations, and then retry the I/O cutover process. In the case of Failure Modes 3, 4, and 5, the state of Path 190 may be unavailable and the state of Path 192 may be active, and this part of the I/O cutover process is not negatively impacted.

In another example, at the point in the I/O cutover process at which metadata for the logical volume is being copied from the Source Data Storage Appliance 100 to the Destination Data Storage Appliance 150, in the case of Failure Mode 1, the state of Path 190 may be active and the state of Path 192 may be unavailable, and I/O Cutover Logic 124 may attempt to resume processing of host I/O operations directed to the logical volume on Source Data Storage Appliance 100, but ignore any resulting failures, so that it will also attempt to resume processing of host I/O operations directed to the logical volume on Destination Data Storage Appliance 150. The I/O cutover process may also be retried. In the case of Failure Mode 2, the state of Path 190 may be active and the state of Path 192 may be unavailable, and I/O Cutover Logic 124 may roll back the I/O cutover process to its initial state. In the case of Failure Modes 3, 4, or 5, the state of Path 190 may be active and the state of Path 192 may be unavailable, the I/O freeze timers may have expired, causing the commands issued by I/O Cutover Logic 124 to be rejected, and the I/O cutover process can be rolled back.

In another example, at the point in the I/O cutover process at which the Logical Volume Path State 118 is being changed to indicate that Path 190 is unavailable and Path 192 is active, in the case of Failure Mode 1, the state of Path 190 may be active and the state of Path 192 may be unavailable, but there is also chance that the state of both Path 190 and Path 192 may be unavailable, which is undesirable but acceptable for short time periods if necessary to avoid a situation in which Path 190 and Path 192 are both active. For example, Control Plane Component 107 may wait until communication to the Source Data Storage Appliance 100 is restored, and then expressly set the state of Path 190 to active and the state of Path 192 to unavailable in Logical Volume Path State 118. Both I/O freeze timers may also be cancelled if they have not already expired. The I/O cutover process may then be retried. In the case of Failure Modes 3, 4, and 5, if one or both I/O freeze timers has expired, then the I/O cutover process may be rolled back.

In another example, at the point in the I/O cutover process at which the Logical Volume Path State 168 is being changed to indicate that Path 190 is unavailable and Path 192 is active, and/or when processing of host I/O operations directed to the logical volume is being resumed on the Source Data Storage Appliance 100, some embodiments may consider this a point of no return in the I/O cutover process, after which point it may be possible to allow the I/O cutover process to complete, even in the face of certain failure modes. For example, in the case of Failure Mode 2 at this point, the state of Path 190 may be active and the state of Path 192 may be unavailable, but there is a chance that the state of both Path 190 and Path 192 may become unavailable. In order to avoid the possibility of Path 190 and Path 192 both being active at the same time, Control Plane Component 107 must wait until communication to the Destination Data Storage Appliance 150 is restored, and then expressly set the state of Path 190 to active and the state of Path 192 to unavailable in Logical Volume Path State 168. Both I/O freeze timers may be cancelled if they have not already expired. The I/O cutover process can then be allowed to complete without rolling back any previously performed steps. In the case of Failure Modes 3, 4, and 5, the state of Path 190 may be active and the state of Path 192 may be unavailable, and there is a chance that the state of both Path 190 and Path 192 may become unavailable, but the I/O cutover process can also be allowed to complete without rolling back any previously performed steps.

In another example, at the point in the I/O cutover process at which processing of host I/O operations directed to the logical volume is being resumed in the Source Data Storage Appliance 100, in the case of Failure Mode 1, the state of Path 190 may be unavailable and the state of Path 192 may be active, and the I/O cutover process can also be allowed to complete without rolling back any previously performed steps.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
at the start of an I/O cutover process that changes host computer access to a logical volume from a source data storage appliance to a destination data storage appliance, and during which processing of host I/O operations directed to the logical volume is frozen, setting at least one I/O freeze timer, wherein the at least one I/O freeze timer includes an I/O freeze timer in the destination data storage appliance, wherein setting the I/O freeze timer is performed at the time that processing of host I/O operations directed to the logical volume is frozen at the start of the I/O cutover process, wherein processing of host I/O operations directed to the logical volume is frozen at the start of the I/O cutover process at least in part by freezing processing of host I/O operations directed to the logical volume in the destination data storage appliance;
at the time processing of host I/O operations directed to the logical volume is frozen in the destination data storage appliance, setting the I/O freeze timer in the destination data storage appliance; and
in response to expiration of the I/O freeze timer, and prior to completion of the I/O cutover process, resuming processing of host I/O operations directed to the logical volume.

2. The method of claim 1, further comprising:
in response to expiration of the I/O freeze timer in the destination data storage appliance, resuming processing of I/O operations directed to the logical volume in the destination data storage appliance.

3. The method of claim 1, wherein processing of host I/O operations directed to the logical volume is frozen at the start of the I/O cutover process at least in part by freezing processing of host I/O operations directed to the logical volume in the source data storage appliance; and
at the time processing of host I/O operations directed to the logical volume is frozen in the source data storage appliance, setting an I/O freeze timer in the source data storage appliance.

4. The method of claim 3, further comprising:
in response to expiration of the I/O freeze timer in the source data storage appliance, resuming processing of I/O operations directed to the logical volume in the source data storage appliance.

5. The method of claim 1, further comprising:
performing the I/O cutover process as part of migrating the logical volume from the source data storage appliance to the destination data storage appliance.

6. The method of claim 5, further comprising:
performing the I/O cutover process in response to commands issued by an I/O cutover logic component; and wherein a duration of the I/O freeze timer is indicated by one of the commands issued by the I/O cutover logic component.

7. The method of claim 6, further comprising:
rejecting a command issued by the I/O cutover logic component in response to detecting that the I/O freeze timer has already expired when the command is received.

8. The method of claim 7, wherein processing of host I/O operations directed to the logical volume is frozen in response to one of the commands issued by the I/O cutover logic component, and further comprising:
generating a transaction identifier;
passing the transaction identifier to the I/O cutover logic component; and
wherein commands issued by the I/O cutover logic component subsequent to the host I/O operations directed to the logical volume being frozen include the transaction identifier.

9. The method of claim 1, wherein successful completion of the I/O cutover process includes resuming processing of host I/O operations directed to the logical volume, and further comprising cancelling the I/O freeze timer in response to successful completion of the I/O cutover process.

10. A system, comprising:
processing circuitry;
memory having program code stored thereon that is executable on the processing circuitry, wherein the program code, when executed on the processing circuitry, causes the processing circuitry to:
at the start of an I/O cutover process that changes host computer access to a logical volume from a source data storage appliance to a destination data storage appliance, and during which processing of host I/O operations directed to the logical volume is frozen, set at least one I/O freeze timer, wherein the at least one I/O freeze timer includes an I/O freeze timer in the destination data storage appliance, wherein the I/O freeze timer is set at the time that processing of host I/O operations directed to the logical volume is frozen at the start of the I/O cutover process, wherein processing of host I/O operations directed to the logical volume is frozen at the start of the I/O cutover process at least in part by freezing processing of host I/O operations directed to the logical volume in the destination data storage appliance;
at the time processing of host I/O operations directed to the logical volume is frozen in the destination data storage appliance, set the I/O freeze timer in the destination data storage appliance; and
in response to expiration of the I/O freeze timer, and prior to completion of the I/O cutover process, resume processing of host I/O operations directed to the logical volume.

11. The system of claim 10, wherein the program code, when executed on the processing circuitry, further causes the processing circuitry to:
in response to expiration of the I/O freeze timer in the destination data storage appliance, resume processing of I/O operations directed to the logical volume in the destination data storage appliance.

12. The system of claim 10, wherein the program code, when executed on the processing circuitry, further causes the processing circuitry to:
freeze processing of host I/O operations directed to the logical volume at the start of the I/O cutover process at least in part by freezing processing of host I/O operations directed to the logical volume in the source data storage appliance; and
at the time that processing of host I/O operations directed to the logical volume is frozen in the source data storage appliance, set an I/O freeze timer in the source data storage appliance.

13. The system of claim 12, wherein the program code, when executed on the processing circuitry, further causes the processing circuitry to:
in response to expiration of the I/O freeze timer in the source data storage appliance, resume processing of I/O operations directed to the logical volume in the source data storage appliance.

14. The system of claim 10, wherein the program code, when executed on the processing circuitry, further causes the processing circuitry to perform the I/O cutover process as part of migrating the logical volume from the source data storage appliance to the destination data storage appliance.

15. A non-transitory computer readable medium, the non-transitory medium having a set of instructions stored thereon, the set of instructions, when executed on processing circuitry, causes the processing circuitry to perform the steps of:
at the start of an I/O cutover process that changes host computer access to a logical volume from a source data storage appliance to a destination data storage appliance, and during which processing of host I/O operations directed to the logical volume is frozen, setting at least one I/O freeze timer, wherein the at least one I/O freeze timer includes an I/O freeze timer in the destination data storage appliance, wherein setting the I/O freeze timer is performed at the time that processing of host I/O operations directed to the logical volume is frozen at the start of the I/O cutover process, wherein processing of host I/O operations directed to the logical volume is frozen at the start of the I/O cutover process at least in part by freezing processing of host I/O operations directed to the logical volume in the destination data storage appliance;
at the time processing of host I/O operations directed to the logical volume is frozen in the destination data storage appliance, setting the I/O freeze timer in the destination data storage appliance; and
in response to expiration of the I/O freeze timer, and prior to completion of the I/O cutover process, resuming processing of host I/O operations directed to the logical volume.

16. The method of claim 1, wherein setting the at least one I/O freeze timer comprises setting the at least one I/O freeze timer to a duration that is less than an I/O completion time limit of a host operating system executing in a host computer from which the host I/O operations directed to the logical volume are conveyed from at least one initiator port.

* * * * *